US011990665B2

(12) United States Patent
Ring et al.

(10) Patent No.: US 11,990,665 B2
(45) Date of Patent: May 21, 2024

(54) MULTI-DIRECTION DEPLOYABLE ANTENNA

(71) Applicant: M.M.A. Design, LLC, Louisville, CO (US)

(72) Inventors: Timothy John Ring, Louisville, CO (US); Susan Christine Tower, Louisville, CO (US)

(73) Assignee: M.M.A. Design, LLC, Louisville, CO (US)

( * ) Notice: Subject to any disclaimer, the term of this patent is extended or adjusted under 35 U.S.C. 154(b) by 0 days.

(21) Appl. No.: 17/880,179

(22) Filed: Aug. 3, 2022

(65) Prior Publication Data

US 2023/0044114 A1 Feb. 9, 2023

Related U.S. Application Data

(60) Provisional application No. 63/229,412, filed on Aug. 4, 2021.

(51) Int. Cl.

| | |
|---|---|
| ***H01Q 1/12*** | (2006.01) |
| ***H01Q 1/08*** | (2006.01) |
| ***H01Q 1/28*** | (2006.01) |

(52) U.S. Cl.

CPC ............. *H01Q 1/1235* (2013.01); *H01Q 1/08* (2013.01); *H01Q 1/288* (2013.01)

(58) Field of Classification Search

CPC ........ H01Q 1/1235; H01Q 1/08; H01Q 1/288; H01Q 21/062; H01Q 1/28

See application file for complete search history.

(56) References Cited

U.S. PATENT DOCUMENTS

| | | | |
|---|---|---|---|
| 3,010,372 A | 11/1961 | Lanford | |
| 3,698,958 A | 10/1972 | Williamson et al. | |

(Continued)

FOREIGN PATENT DOCUMENTS

| | | | |
|---|---|---|---|
| EP | 0957536 A1 | 11/1999 | |
| EP | 1043228 B1 | 3/2003 | |

(Continued)

OTHER PUBLICATIONS

"International Search Report And Written Opinion Issued In PCT Application No. PCT/US22/039288", dated Oct. 19, 2022, 11 Pages.

(Continued)

*Primary Examiner* — Hoang V Nguyen
*Assistant Examiner* — Yonchan J Kim
(74) *Attorney, Agent, or Firm* — Holzer Patel Drennan

(57) ABSTRACT

An antenna system for space applications provides a membrane antenna with one or more flexible membranes. An antenna enclosure stores the membrane antenna during stowage. One or more first deployable support structures extend along a first axis from the antenna enclosure during deployment, at least a first point of the membrane antenna being operably anchored to a point on the first deployable support structures. Deployment mechanisms are operably anchored at a junction with the first deployable support structures. The deployment mechanisms extend one or more second deployable support structures along a second axis from the first deployable support structures during deployment. At least a second point of the membrane antenna is operably anchored to a point on the second deployable support structures. Extension of the first deployable support structures and second deployable support structures unfurls the membrane antenna along both axes to overlap the junction.

29 Claims, 7 Drawing Sheets

(56) References Cited

U.S. PATENT DOCUMENTS

| | | | | |
|---|---|---|---|---|
| 4,133,501 | A | 1/1979 | Pentlicki | |
| 4,375,878 | A | 3/1983 | Harvey | |
| 4,380,013 | A * | 4/1983 | Slysh | F24S 23/81 244/172.6 |
| 5,040,907 | A | 8/1991 | Harvey | |
| 5,189,773 | A | 3/1993 | Harvey | |
| 5,228,644 | A | 7/1993 | Garriott | |
| 5,296,044 | A | 3/1994 | Harvey | |
| 5,298,085 | A | 3/1994 | Harvey | |
| 5,365,241 | A | 11/1994 | Williams | |
| 5,520,747 | A | 5/1996 | Marks | |
| 5,644,322 | A | 7/1997 | Hayes | |
| 5,777,582 | A * | 7/1998 | Raab | H01Q 1/08 343/915 |
| 5,785,280 | A | 7/1998 | Baghdasarian | |
| 6,010,096 | A | 1/2000 | Baghdasarian | |
| 6,017,002 | A | 1/2000 | Burke | |
| 6,081,234 | A | 6/2000 | Huang | |
| 6,217,975 | B1 | 4/2001 | Daton-Lovett | |
| 6,384,787 | B1 | 5/2002 | Kim | |
| 6,581,883 | B2 | 6/2003 | McGee | |
| 6,647,668 | B1 | 11/2003 | Cohee et al. | |
| 6,970,143 | B2 | 11/2005 | Allen | |
| 6,983,914 | B2 | 1/2006 | Stribling | |
| 7,030,824 | B1 | 4/2006 | Taft | |
| 7,602,349 | B2 | 10/2009 | Hentosh | |
| 8,289,221 | B1 | 10/2012 | Finucane | |
| 8,356,774 | B1 | 1/2013 | Banik | |
| 8,720,830 | B1 | 5/2014 | Szatkowski | |
| 8,757,554 | B1 | 6/2014 | Harvey | |
| 8,814,099 | B1 | 8/2014 | Harvey | |
| 8,816,187 | B1 | 8/2014 | Stribling | |
| 8,905,357 | B1 | 12/2014 | Harvey | |
| 9,214,892 | B2 | 12/2015 | White | |
| 9,270,021 | B1 | 2/2016 | Harvey | |
| 9,528,264 | B2 | 12/2016 | Freebury | |
| 9,550,584 | B1 * | 1/2017 | Harvey | B64G 1/222 |
| 9,593,485 | B2 | 3/2017 | Freebury | |
| 9,676,501 | B1 | 6/2017 | Spence et al. | |
| 9,840,060 | B2 | 12/2017 | Francis | |
| 10,119,292 | B1 | 11/2018 | Harvey | |
| 10,170,843 | B2 | 1/2019 | Thomson | |
| 10,211,535 | B2 | 2/2019 | Rahmat-Samii | |
| 10,256,530 | B2 | 4/2019 | Freebury | |
| 10,263,316 | B2 | 4/2019 | Harvey | |
| 10,276,926 | B2 | 4/2019 | Cwik | |
| 10,283,835 | B2 | 5/2019 | Harvey | |
| 10,370,126 | B1 | 8/2019 | Harvey | |
| 10,418,721 | B2 | 9/2019 | Chattopadhyay | |
| 2008/0283670 | A1 | 11/2008 | Harvey | |
| 2012/0235874 | A1 | 9/2012 | Kwak | |
| 2016/0197394 | A1 | 7/2016 | Harvey et al. | |
| 2017/0110803 | A1 | 4/2017 | Hodges | |
| 2018/0111703 | A1 * | 4/2018 | Hensley | B64G 1/222 |
| 2018/0128419 | A1 | 5/2018 | Brown | |
| 2018/0203225 | A1 | 7/2018 | Freebury | |
| 2018/0244405 | A1 | 8/2018 | Brown | |
| 2018/0297724 | A1 | 10/2018 | Harvey | |
| 2019/0027835 | A1 | 1/2019 | Hoyt | |
| 2019/0063892 | A1 | 2/2019 | Brown | |
| 2019/0237859 | A1 | 8/2019 | Freebury | |
| 2022/0181787 | A1 * | 6/2022 | Taylor | H01Q 1/288 |

FOREIGN PATENT DOCUMENTS

| | | | |
|---|---|---|---|
| EP | 3059800 | B1 | 8/2017 |
| WO | 2017054005 | A1 | 3/2017 |
| WO | 2018005532 | A1 | 1/2018 |
| WO | 2018191427 | A1 | 10/2018 |
| WO | 2019171062 | A1 | 12/2019 |

OTHER PUBLICATIONS de Boer, GaAs Mixed Signal Multi-Function X-Band Mmic with 7 Bit Phase and Amplitude Control and Integrated Serial to Parallel Converter, TNO Physics and Electronics Laboratory.
Grafmuller, et al, "The TerraSAR-X Antenna System", 2005 IEEE.
Gatti et al, Computation of Gain, Noise Figure, and Third-Order Intercept of Active Array Antennas. IEEE Transactions on Antennas and Propagation, vol. 52, No. 11, Nov. 2004.
Moreira, TerraSAR-X Upgrade to a Fully Polarimetric Imaging Mode. German Aerospace Center (DLR), Jan. 16, 2003.
Smith et al., Coplanar Waveguide Feed for Microstrip Patch Antennas. Electronics Letters, vol. 28, No. 25. Dec. 3, 1992.
Gatti et al., A Novel Phase-Only Method for Shaped Beam Synthesis and Adaptive Nulling. University of Perugia, Dept. Electronic and Information Engineering.
Mencagli et al., Design of Large MM-Wave Beam-Scanning Reflectarrays. University of Perugia, Dept. Electronic and Information Engineering.
Sorrentino et al., Beam Steering Reflectarrays. University of Perugia.
Kim et al., Spaceborne SAR Antennas for Earth Science.
Marcaccioli et al., Beam Steering MEMS mm-Wave Reflectarrays. University of Perugia, Dept. of Information and Electronic Engineering.
Sorrentino et al., Electronic Reconfigurable MEMS Antennas. University of Perugia, Dept. of Electronic and Information Engineering.
Bachmann et al., TerraSAR-X In-Orbit Antenna Model Verification Results. German Aerospace Center (DLR).
Bialkowski et al., Bandwidth Considerations for a Microstrip Reflectarray. Progress In Electromagnetics Research B, vol. 3, 173-187, 2008.
Mikulas et al., Tension Aligned Deployable Structures for Large 1-D and 2-D Array Applications. 49th AIAA/ASME/ASCE/AHS/ASC Structures, Structural Dynamics and Materials Conference, Apr. 7-10, 2008.
Freeman et al., On the Use of Small Antennas for SAR and SAR Scatterometer Systems.
Gatti et al., Scattering Matrix Approach to the Design of Infinite Planar Reflectarray Antennas. DIEI, University of Perugia.
Ebadi et al., Linear Reflectarray Antenna Design Using 1-bit Digital Phase Shifters. D.I.E.I. University of Perugia.
Ebadi et al., Near Field Focusing in Large Reflectarray Antennas Using 1-bit Digital Phase Shifters. DIEI, University of Perugia.
Sorrentino et al., Recent Advances on Millimetre Wave Reconfigurable Reflectarrays. DIEI, University of Perugia.
Chen et al., Fully Printed Phased-Array Antenna for Space Communications.
Gatti et al., Millimetre Wave Reconfigurable Reflectarrays. RF Microtech, a spin-off of the University of Perugia, c/o DIEI.
Montori et al., Constant-Phase Dual Polarization MEMS-Based Elementary Cell for Electronic Steerable Reflectarrays. University of Perugia, Dept. of Electronic and Information Engineering.
Marcaccioli et al., RF MEMS-Reconfigurable Architectures for Very Large Reflectarray Antennas. Dept. of Electronic and Information Engineering, University of Perugia.
Carrasco et al., Dual-polarization reflectarray elements for Ku-band Tx/Rx portable terminal antenna. RF Microtech.
Mencagli et al., Design and Realization of a MEMS Tuneable Reflectarray for mm-wave Imaging Application. University of Perugia, DIEI.
Younis, et al, A Concept for a High Performance Reflector-Based X-Band SAR. German Aerospace Center (DLR), Microwaves and Radar Institute.
Montori et al., Design and Measurements of a 1-bit Reconfigurable Elementary Cell for Large Electronic Steerable Reflectarrays. Dept. of Electronic and Information Engineering.
Montori et al., 1-bit RF-MEMS-Reconfigurable Elementary Cell for Very Large Reflectarray. Dept. of Electronic and Information Engineering.
Moussessian et al., An Active Membrane Phased Array Radar. Jet Propulsion Laboratory, California Institute of Technology.
Fisher, Phased Array Feeds For Low Noise Reflector Antennas. Electronics Division Internal Report No. 307, Sep. 24, 1996.

(56) References Cited

OTHER PUBLICATIONS

Montori et al., Wideband Dual-Polarization Reconfigurable Elementary Cell for Electronic Steerable Reflectarray at Ku-Band. University of Perugia, Dept. of Electronic and Information Engineering.
Gannudi et al., Preliminary Design of Foldable Reconfigurable Reflectarray for Ku-Band Satellit4e Communication. University of Perugia, Dept. of Electronic and Information Engineering.
Tienda, et al., Dual-Reflectarray Antenna for Bidirectional Satellite Links in Ku-Band. European Conference on Antennas and Propagation, Apr. 11-15, 2011.
Lane et al., Overview of the Innovative Space-Based Radar Antenna Technology Program. Journal of Spacecraft and Rockets. vol. 48, No. 1. Jan.-Feb. 2011.
Devireddy et al., Gain and Bandwidth Limitations of Reflectarrays. Dept. of Eletrical Engineering. ACES Journal, vol. 26, No. 2. Feb. 2011.
Knapp et al., Phase-Tilt Radar Antenna Array. Dept. of Electrical and Computer Engineering, University of Massachusetts.
Moussessian et al., Large Aperture, Scanning, L-Band SAR (Membrane-based Phased Array). 2011 Earth Science Technology Forum.
Arista et al., Reskue Project: Transportable Reflectarray Antenna For Satellite Ku-Band Emergency Communications.
DuPont Kapton, Polyimide Film. General Specifications.
Footdale et al., Static Shape and Modal Testing of a Deployable Tensioned Phased Array Antenna. 53rd AIAA/ASME/ASCE/AHS/ASC Structures, Structural Dynamics and Materials Conference. Apr. 23-26, 2012.
Montori et al., Reconfigurable and Dual-Polarization Folded Reflectarray Antenna. Dept. of Electronic and Information Engineering. University of Perugia.
Zebrowski, Illumination and Spillover Efficiency Calculations for Rectangular Reflectarray Antennas. High Frequency Electronics.
Jeon et al., Structural Determinancy and Design Implications for Tensioned Precision Deployable Structures. 54th AIAA/ASME/ASCE/AHS/ASC Structures, Structural Dynamics, and Materials Conference. Apr. 8-11, 2013.
Bachmann et al., TerraSAR-X Antenna Calibration and Monitoring Based on a Precise Antenna Model.
Hum et al., Reconfigurable Reflectarrays and Array Lenses for Dynamic Antenna Beam Control: A Review. IEEE Transactions on Antennas and Propagation. Aug. 21, 2013.
Hodges et al., ISARA Integrated Solar Array Reflectarray Mission Overview. Jet Propulsion Laboratory. California Institute of Technology. Aug. 10, 2013.
Cooley, Michael "Phased Array-Fed Reflector (PAFR) Antenna Architectures for Space-Based Sensors." Northtrop Grumman Electronic Systems. 2015.
FedBizOpps, Cubesat Solar Sail Systems—ManTech/Nexolve. Oct. 25, 2013.
Metzler, Thomas "Design and Analysis of a Microstrip Reflectarray". University of Massachusetts. 1993.
Synak, Aleksander "Erasmus Student Exchange Project: Design and Implementation of UHF Patch Antenna." Universitat Politecnica De Catalunya.
Warren et al., Large, Deployable S-Band Antenna for a 6U Cubesat. 29th Annual AIAA/USU Conference on Small Satellites.
Sauder et al., Ultra-Compact Ka-Band Parabolic Deployable Antenna for RADAR and Interplanetary CubeSats. 29th Annual AIAA/USU Conference on Small Satellites.
Kelly, A Scalable Deployable High Gain Reflectarray Antenna—DaHGR. MMA Design LLC.
Montori et al., A Transportable Reflectarray Antenna for Satelitte Ku-Band Emergency Communications. IEEE Transactions on Antennas and Propagation. vol. 63, No. 4, Apr. 2015.
Larranaga et al., On the Added Value of Quad-Pol Data in a Multi-Temporal Crop Classification Framework Based on RADARSAT-2 Imagery. Remote Sens. 2016, 8, 335.
Petkov et al., Charge Dissipation in Germanium-Coated Kapton Films at Cryogenic Temperatures. Jet Propulsion Laboratory. California Institute of Technology.
Sheldahl, Product Bulletin, Germanium Coated Polyimide.
Medina-Sanchez, Rafael "Beam Steering Control System for Low-Cost Phased Array Weather Radars: Design and Calibration Techniques". Doctoral Dissertations. University of Massachusetts. May 2014.
Eom et al., A Cylindrical Shaped-Reflector Antenna with a Linear Feed Array For Shaping Complex Beam Patterns. Progress in Electromagnetics Research. vol. 119, 477-495, 2011.
Lenz et al., Highly Integrated X-band Microwave Modules for the TerraSAR-X Calibrator.
Kumar et al., Design of a Wideband Reduced Size Microstrip Antenna in VHF/Lower UHF Range.
Giauffret et al., Backing of Microstrip Patch Antennas Fed by Coplanar Waveguides. 26th EuMC, Sep. 9-12, 1996.
Salazar et al., Phase-Tilt Array Antenna Design for Dense Distributed Radar Networks for Weather Sensing. IGARRS 2008.
Gatti et al., Slotted Waveguide Antennas with Arbitrary Radiation Pattern. University of Perugia.
Huber et al., Spaceborne Reflector SAR Systems with Digital Beamforming. IEE Transactions on Aerospace and Electronic Systems. vol. 48, No. 4. Oct. 2012.
Mejia-Ariza et al., "Ultra-Flexible Advanced Stiffness Truss (U-FAST)" AIAA SciTech Fourm. Jan. 4-8, 2016.
Rogers Corporation, Copper Foils for High Frequency Materials.
Younis et al., Performance Comparision of Reflector-and Planar-Ant4enna Based Digital Beam-Forming SAR. International Journal of Antennas and Propagation. vol. 2009.
Montori et al., Novel 1-bit Elementary Cell for Reconfigurable Reflectarray Antennas. Dept. of Electronic and Information Engineering. University of Perugia.
Gatti, Roberto "Pubblicazioni Reflectarrays".
Montori et al., W-band beam-steerable MEMS-based reflectarray. International Journal of Microwave and Wireless Technologies. Jul. 15, 2011.
Pehrson et al., Folding Approaches for Tensioned Precision Planar Shell Structures. AIAA SciTech Fourm. 2018 AIAA Spacecraft Structures Conference. Jan. 8-12, 2018.
Greschik et al., Error Control via Tension for an Array of Flexible Square Antenna Panels. 51st AIAA/ASME/ASCE/AHS/ASC Structures, Structural Dynamics, and Materials Conference. Apr. 12-16, 2010.
Greschik et al., Strip Antenna Figure Errors Due to Support Truss Member Length Imperfections. 45th AIAA/ASME/ASCE/AHS/ASC Structures, Structural Dynamics and Materials Conference. Apr. 19-22, 2004.
DuPont Kapton 200EN Polyimide Film, 50 Micron Thickness. http://www.matweb.com/search/datasheet_print.aspx?matguid=305905ff1ded40fdaa34a18d8727a4dc.
European Search Report for European Patent Appl. No. 16155768.1, dated Jul. 15, 2016.
Focatiis et al . , Deployable Membranes Designed from Folding Tree Leaves , Philosophical Transactions of the Royal Society of London A , 2002 , pp . 1-12 , The Royal Society.
Guest et al . , Inextensional Wrapping of Flat Membranes , Proceedings of the First International Seminar on Structural Morphology ,Sep. 7-11 , 1992 , pp. 203-215.
Im et al . , Prospects of Large Deployable Reflector Antennas for a New Generation of Geostationary Doppler Weather Radar
Satellites , AIAA Space 2007 Conference & Exposition , Sep. 18-20 ,2007 , pp. 1-11 , American Institute of Aeronautics and Astronautics , Inc.
Mallikarachchi , Thin-Walled Composite Deployable Booms with Tape—Spring Hinges , May 2011 , pp. 1-181, University of Cambridge.
Thomson , Mechanical vs . Inflatable Deployable Structures for Large Apertures or Still No Simple Answers , Nov. 10-11 , 2008 , pp. 1-24 , Keck Institute for Space Sciences.
Huang et al . , Reflectarray Antennas , Oct. 2007 , pp . ii-xii , 1-7 , 9-26 , 112-118 , 137-143 , 182-193 and 201 205.
Arya, Wrapping Thick Membranes with Slipping Folds, American Institute of Aeronautics and Astronautics, California Institute of Technology.

(56) References Cited

OTHER PUBLICATIONS

Biddy et al., LightSail-1 Solar Sail Design and Qualification, May 2012, pp. 451-463, Proceedings of the 41st Aerospace Mechanisms Symposium, Jet Propulsion Laboratory.
John Wiley & Sons , Inc .CubeSat Design Specification Rev 13 , Feb. 20, 2014 , pp. 1-42 , California Polytechnic State University.
Cesar-Auguste et al., An Investigation of Germanium Coated Black Kapton and Upilex Films under Different Environmental Ground Conditions, ESA-ESTEC, Materials Technology Section, The Netherlands.
Dearborn et al., A Deployable Membrane Telescope Payload for CubeSats, JoSS, vol. 3, No. 1., pp. 253-264.
Demaine, Geometric Folding Algorithms: Linkages, Origami, Polyhedra, Fall 2010.
Demaine et al., Geometric Folding Algorithms, Feb. 2007.
Fang, et al., In-Space Deployable Reflectarray Antenna: Current and Future, American Institute of Aeronautics and Astronautics.
Kelly, A Scalable Deployable High Gain Antenna-DaHGR, 30th Annual AIAA/USU, Conference on Small Satellites.
Kiziah et al., Air Force Academy Department of Physics Space Technologies Development and Research, May 2014, 30th Space Symposium.
Leipold et al., Large SAR Membrane Antennas with Lightweight Deployable Booms, Jun. 2005, 28th ESA Antenna Workshop on Space Antenna Systems and Technologies.
Shaker et al., Reflectarray Antennas Analysis, Design, Fabrication, and Measurement, Book, 2014, Artech House.
Stella et al., Current Results From the Advanced Photovoltaic Solar Array (APSA) Program.
Straubel, Design and Sizing Method for Deployable Space Antennas, Dissertation, Jul. 2012.
Su et al., Wrinkling Analysis of a Kapton Square Membrane under Tensile Loading, Apr. 2003.
Triolo, NASA Technical Reports Server (NTRS) 20150017719: Thermal Coatings Seminar Series Training Part 2: Environmental Effects, Aug. 2015.
Huang, The Development of Inflatable Array Antennas, Jet Propulsion Laboratory, California Institute of Technology.
Huang et al., Inflatable Microstrip Reflectarray Antennas at X and Ka-band Frequencies, Jul. 1999.
Huang et al., A One-Meter X-Band Inflatable Reflectarray Antenna, Jet Propulsion Laboratory, California Institute of Technology.
Integrated Solar Array and Reflectarray Antenna (ISARA), National Aeronautics and Space Admnistration (NASA), May 3, 2013.
MacGillivray, Charles, "Miniature Deployable High Gain Antenna for CubeSats", Apr. 2011.
Military Specification (MIL)-A-83577B (USAF), Assemblies, Moving Mechanical, for Space and Launch Vehicles, General Specification For (DOD, Mar. 15, 1978).
TRW Engineering & Test Division, (1990) Advanced Photovoltaic Solar Array Prototype . Fabrication, Phase IIB, JPL Contract No. 957990 (Mod 6), TRW Report No. 51760-6003-UT-00.
"Capella Space closes $19M Series B to deliver reliable Earth Observation data on demand", Capella Space, Sep. 26, 2018.
"Capella Space", GlobalSecurity.org, https://www.globalsecurity.org/space/systems/capella.htm.
Fernholz, Tim, "Silicon Valley is investing $19 million in space radar", Quartz, Sep. 29, 2018.
Werner, Debra "Capella's First Satellite launching this fall", Spacenews, Aug. 8, 2018.
Capella Space is First American Company to Send Advanced Commercial Radar Satellite to Space', Markets Insider, Dec. 3, 2018.
"Capella X-SAR (Synthetic Aperture Radar) Constellation", eoPortal Directory.
Banazedehm, Payam "Prepare to Launch [Entire Talk]", Stanford eCorner, Aug. 5, 2019.
Kamra, Deepak "Capella Space—Getting the Full Picture", Canaan, Jan. 7, 2017.
"Capella Space Corporation—Testing the First Commercial U.S. SAR Satellite".
Werner, Debra "Capella Space gets ready for primetime as constellation operator", Spacenews, Jun. 3, 2019.
Capella Space "The Capella 36".
MMA Design LLC "Another MMA HaWk Takes Flight" https://mmadesignllc.com/2019/05/sparc-1-hawks-take-flight/.
MMA Design LLC "FalconSAT-7 Finally Earns its Wings!" https://mmadesign.com/2019/07/falconsat-7-finally-earns-its-wings/.
MMA Design LLC "Customize Your HaWK" https://mmadesignllc.com/customize-your-hawk/.
MMA Design LLC "Asteria's HaWK solar arrays successfully deploy in space!" https://mmadesignllc.com/2018/01/asteria-hawk-deploys-in-space/.
MMA Design LLC "MarCO HaWKs Headed to Mars!" https://mmadesignllc.com/2018/05/marco-mission-hawks-poised-for-launch-2/.
MMA Design LLC "JPL's ASTERIA wins SmallSat Mission of the Year!" https.
MMA Design LLC "MarCO Mission HaWKs poised for launch!" https://mmadesignllc.com/2018/04/marco-mission-hawks-poised-for-launch/.
MMA Design LLC "MarCO Mission's twin CubeSats rule the headlines" https://mmadesignllc.com/2018/11/marco-rules-the-headlines/.
MMA Design LLC "MMA Solar Arrays Launch on ASTERIA CubeSat!" https://mmadesignllc.com/2017/08/asteria-launch/.
MMA Design LLC "eHaWK 27A-84FV".
MMA Design LLC "eHaWK 27AS112".
MMA Design LLC "HaWK 17A-42".
MMA Design LLC "HaWK 17AB36".
MMA Design LLC "HaWK 17AS42".
MMA Design "HaWK 17AS56".
MMA Design LLC "T-DaHGR X-Band Antenna for CubeSats—1-meter diametere aperture deployed from 1U", 2019 CubeSat Workshop, Apr. 2019.
MMA Design LLC "Our Missions" https://mmadesignllc.com/about/missions/.
MMA Design LLC "P-DaHGR Antenna" https://mmadesignllc.com/product/p-dahgr-antenna/.
MMA Design LLC "R-DaHGR" https://mmadesignllc.com/product/large-aperture-rigid-array-lara/.
MMA Design LLC "Research Grant Awards" https://mmadesignllc.com/about/research-grant-awards/.
MMA Design LLC "rHaWK Solar Array" https://mmadesignllc.com/product/r-hawk-solar-array/.
MMA Design LLC T-DaHGR Antenna' https://mmadesignllc.com/product/t-dahgr-antenna/.
Sheldahl, Product Bulletin, Novaclad G2 300.
Gatti et al., Low Cost Active Scanning Antenna for Mobile Satellite Terminals, University of Perugia, Dept. Electronic and Information Engineering.
Fang Huang, Analysis and Design of Coplanar Waveguide-Fed Slot Antenna Array, IEEE Transactions on Antennas and Propagation, vol. 47, No. 10, Oct. 1999.
MasterSil 155 Mastere Bond Polymer System, MasterSil 155 Technical Data Sheet.
Eccosorb HR Lightweight, Open-cell, Broadband Microwave Absorber, Laird.
Single Wires ESCC 3901018, Axon Cable & interconnect.
ESCC Cables & harnesses made by Axon, Axon Cable & interconnect.
Rahmat-Samii, Ka Band Highly Constrained Deployable Antenna for RalnCube.
Murphy, Tyler et al., PEZ: Expanding CubeSat Capabilities through Innovative Mechanism Design, 25th Annual AIAA/USU Conference on Small Satellites.
Khayatian, Behrouz et al. "Radiation Characteristics of Reflectarray Antennas: Methodology and Applicatios to Dual Configurations", Jet Propulsion Laboratory.
Fang, Houfei Thermal Distortion Analyses of a Three-Meter Inflatable Reflectarray Antenna, Jet Propulsion Laboratory.

(56) References Cited

OTHER PUBLICATIONS

Jones, P. Alan, et al. "Spacecraft Solar Array Technology Trends", AEC-Able Engineering Company, Inc.
Jamaluddin, M.H. et al., "Design, Fabrication and Characterization of a Dielectric Resonator Antenna Reflectarray in Ka-Band", Progress In Electromagnetics Research B, vol. 25, 261-275, 2010.
Mierheim, Olaf, et al. "The Tape Spring Hinge Deployment System of the EU: Cropis Solar Panels", German Aerospace Center DLR.
Ferris et al., The Use, Evolution and Lessons Learnt of Deployable Static Solar Array Mechanisms. Proceedings of the 42nd Aerospace Mechanisms Symposium, NASA Goddard Space Flight Center, May 14-16, 2014.
"DARPA prototype reflectarray antenna offers high performance in small package", PHYSORG, Jan. 23, 2019.
Lele et al., Reflectarray Antennas, International Journal of Computer Applications, vol. 108, No. 3, Dec. 2014.
Cadogan et al., The Development of Inflatable Space Radar Reflectarrays, 40th AIAA/ASME/ASCE/AHS/ASC Structures, Structural Dynamics, and Materials (SDM) Conference, Apr. 12-15, 1999.
Klesh et al., MarCO: CubeSats to Mars in 2016, Jet Propulsion Laboratory, 29th Annual AIAA/USU Conference on Small Satellites.
Huang, John, Capabilities of Print cd Reflectarray Antennas, Jet Propulsion Laboratory, California Institute of Technology.
Huang, John, Review and Design of Printed Reflectarray Antennas, Jet Propulsion Laboratory, California Institute of Technology.
Zawadzki, Mark et al., Integrated RF Antenna and Solar Array for Spacecraft Application, Jet Propulsion Laboratory, California Institute of Technology.
Hand, Thomas, et al., Dual-Band Shared Aperture Reflector/ Reflectarray Antenna Designs, Technologies and Demonstrations for NASA's ACE Radar.
Pacheco, Pedro et al., A Non-Explosive Release Device for Aerospace Applications Using Shape Memory Alloys.
Greco, Francesco et al., A Ka-Band Cylindrical Paneled Reflectarray Antenna, Jun. 10, 2019.
Carrasco, Eduardo et al., Reflectarray antennas: A review, Foundation for Research on Information Technologies in Society (IT'IS).
Zuckermandel, J. et al., Design, Build, and Testing of TacSat Thin Film Solar Arrays, MicroSat Systems, Inc., 20th Annual AIAA/USU Conference on Small Satellites.
Filippazzo, Giancarlo et al., The Potential Impact of Small Satellite Radar Constellations on Traditional Space Systems, 5th Federated and Fractionated Satellite Systems Workshop, Nov. 2-3, 2017.
Cassini Program Environmental Impact Statement Supporting Study, vol. 2: Alternate Mission and Power Study. Jet Propulsion Laboratory, California Institute of Technology, Jul. 1994.
Military Specification. Assemblies, Moving Mechanical, For Space and Launch Vehicles, General Specification For. Apr. 18, 1988.
Dearborn, Michael et al., A Deployable Membrane Telescope Payload for CubeSats. JoSS, vol. 3, No. 1, pp. 253-264.
Engberg, Brian et al., A High Stiffness Boom to Increase the Moment-ARM for a Propulsive Attitude Control System on FalconSat-3. 17th Annual AIAA/USU Conference on Small Satellites. 2003.
Arya, Manan, Wrapping Thick Membranes with Slipping Folds. California Institute of Technology. American Institute of Aeronautics and Astronautics. 2015.
Guest, S.D., et al., Inextensional Wrapping of Flat Membranes. Department of Engineering, University of Cambridge. 1992.
Luo, Qi, et al., Design and Analysis of a Reflectarray Using Slot Antenna Elements for Ka-band SatCom. IEEE Transactions on Antennas and Propagation, vol. 63, No. 4. Apr. 2015.
Leipold, M. et al., Large SAR Membrane Antennas with Lightweight Deployable Booms. 28th ESA Antenna Workshop on Space Antenna Systems and Technologies, ESA/ESTEC, May 31-Jun. 3, 2005.
Fang, Houfei, et al., In-Space Deployable Reflectarray Antenna: Current and Future. American Institute of Aeronautics and Astronautics. 2008.
Rauschenbach, H.S. et al., Solar Cell Array Design Handbook. vol. 1. Jet Propulsion Laboratory. California Institute of Technology. Oct. 1976.
Triolo, Jack, Thermal Coatings Seminar Series Training. Part 1: Properties of Thermal Coatings. NASA GSFC Contamination and Coatings Branch—Code 546. Aug. 6, 2015.
Huang, John, et al., A 1-m X-band Inflatable Reflectarray Antenna. Jet Propulsion Laboratory. California Institute of Technology. Jun. 24, 1998.
Belvin, W., et al., Advanced Deployable Structural Systems for Small Satellites. Sep. 2016.
Cesar-Auguste, Virginie, et al., An Investigation of Germanium Coated Black Kapton and Upilex Films Under Different Environmental Ground Conditions. 2009.
Pacette, Paul E. et al., A Novel Reflector/Reflectarry Antenna. An Enabling Technology for NASA's Dual-Frequency ACE Radar. Jun. 14, 2012.
Mooney, C. et al., STAMET—A Materials Investigation. CNES. 2020.
Sheldahl A Multek Brand, The Red Book. 2019.
eoPortal Directory, FalconSat-7. Satellite Missions. https://directory.eoportal.org/web/eoportal/satellite-missions/f/falconsat-7. 2020.
Finckenor, Miria et al., Results of International Space Station Vehicle Materials Exposed on MISSE-7B. Jun. 27, 2012.
Kurland, Richard et al., Current Results From the Advanced Photovoltaic Solar Array (APSA) Program. Aug. 9, 1993.
Bron Aerotech, Aerospace Material to Spec. 2020.
Straubel, Marco, Design and Sizing Method for Deployable Space Antennas, Dissertation. Jul. 2, 2012.
Biddy, Chris et al., LightSail-1 Solar Sail Design and Qualification. 41st Aerospace Mechanisms Symposium, Jet Propulsion Laboratory, May 16-18, 2012.
Murphey, Thomas W. et al., Tensioned Precision Structures. Air Force Research Laboratory. Jul. 24, 2013.
Kiziah, Rex, et al., Air Force Academy Department of Physics Space Technologies Development and Research. 30th Space Symposium, Technical Track, May 21, 2014.
Smith, Brian FalconSAT-7 Deployable Solar Telescope. United States Air Force Academy. Space Physics and Atmospheric Research Center. Aug. 5, 2014.
Huang, John et al., Reflectarry Antennas. IEEE Press. 2008.
Liu, ZhiQuan, et al., Review of Large Spacecraft Deployable Membrane Antenna Structures. Feb. 28, 2017.
Sheldahl A Multek Brand, Product Bulletin. Germanium Coated Polyimide. 2020.
P. Keith Kelly, A Scalable Deployable High Gain Antenna—DaHGR. 30th Annual AIAA/USU Conference on Small Satellites. 2016.
P. Keith Kelly, A Scalable Deployable High Gain Antenna—DaHGR. Powerpoint. 2016.
Su Xiaofeng, et al., Wrinkling Analysis of a Kapton Square Membrane under Tensile Loading. 44th AIAA/ASME/ASCE/AHS Structures, Structural Dynamics, and Materials Conference. Apr. 7-10, 2003.

* cited by examiner

MULTI-DIRECTION DEPLOYABLE ANTENNA

CROSS-REFERENCE TO RELATED APPLICATIONS

The present application claims the benefit of priority to U.S. Provisional Patent Application No. 63/229,412, entitled "Multi-direction Deployable Antenna" and filed on Aug. 4, 2021, which is specifically incorporated herein by reference.

SUMMARY

The technology described herein relates to a multi-direction deployable antenna for space applications. An antenna system for space applications is provided with a membrane antenna with one or more flexible membranes. An antenna enclosure is configured to store the membrane antenna during stowage. One or more first deployable support structures (e.g., extendable truss booms) are configured to extend along a first axis from the antenna enclosure during deployment, at least a first point of the membrane antenna being operably anchored to a point on the one or more first deployable support structures. One or more deployment mechanisms are operably anchored at a junction with the one or more first deployable support structures. The one or more deployment mechanisms are configured to extend one or more second deployable support structures along a second axis from the one or more first deployable support structures during deployment. At least a second point of the membrane antenna is operably anchored to a point on the one or more second deployable support structures. Extension of the one or more first deployable support structures and one or more second deployable support structures unfurls the membrane antenna along the first axis and the second axis to overlap the junction.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

The technology described herein relates to a multi-direction deployable antenna for space applications. The multi-directional deployable antenna is configured to be stowed in a confined volume within an antenna enclosure during launch and prior to deployment. During deployment, an example expandable truss boom having one or more expandable longerons and one or more battens extends from the antenna enclosure in at least a first direction during deployment of the antenna. The expandable truss boom also supports one or more tape deployers, which extend one or more tape booms (e.g., tape springs) in at least a second direction. During deployment, one or more antenna membranes are unfurled (e.g., unfolded and/or unrolled) in at least the first direction along the expandable truss boom and in at least the second direction along the one or more tape booms.

In one implementation, the antenna includes at least a single antenna membrane, providing RF signal communications via both sides of the antenna membrane (e.g., relative to the Earth's surface on one side and relative to GPS satellites on the other side). In another implementation, the antenna includes three antenna membranes—an artificial dielectric layer, an active dipole layer (e.g., having an 8×8 array of dipoles/sub-apertures, each dipole or sub-aperture being separated by a predefined distance), and a ground layer). The three layers are also separated from each other by predefined distances. The second example implementation provides communications on one side of the antenna. Other configurations are contemplated.

Figure 1:
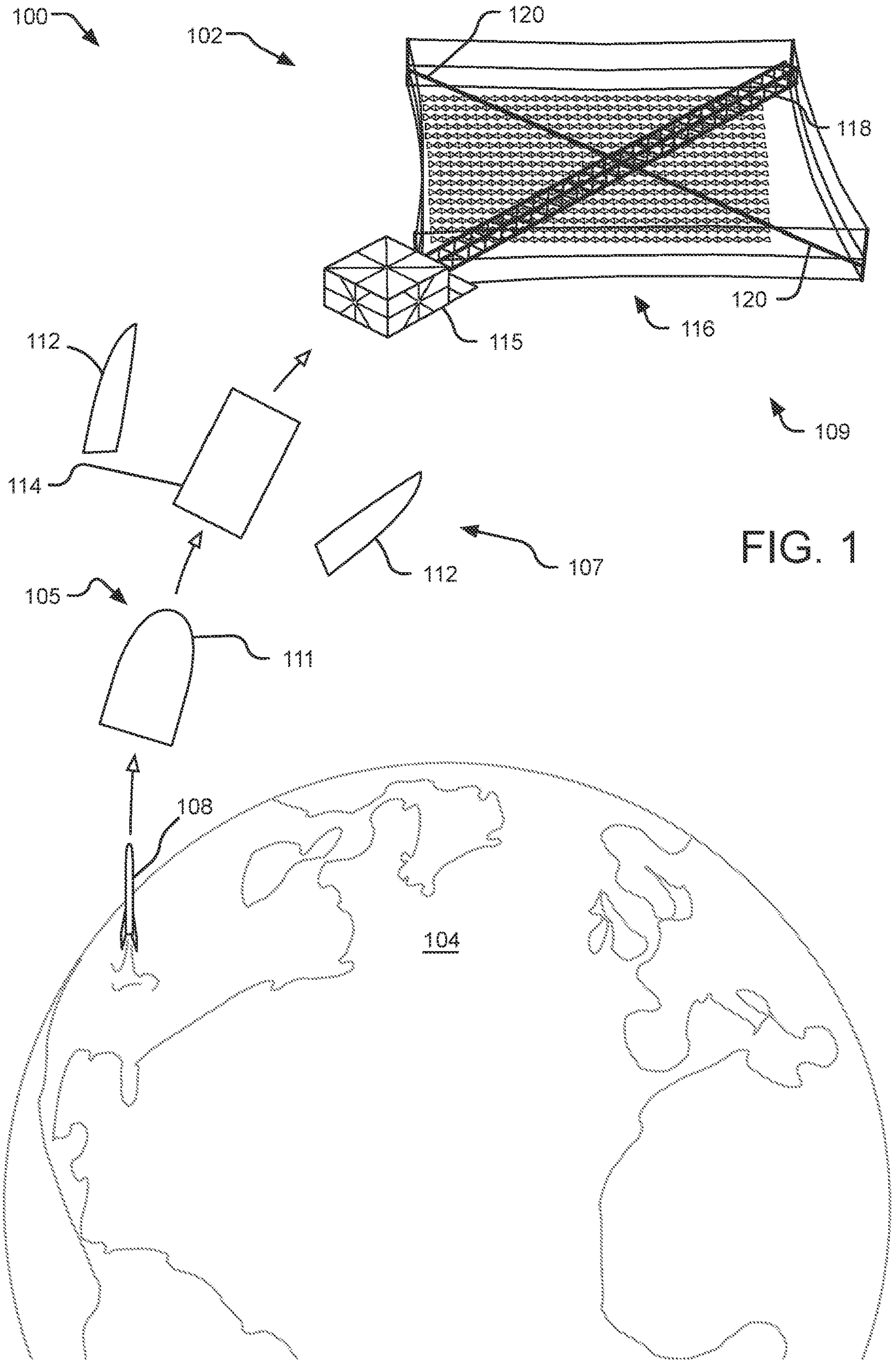
FIG. 1 illustrates an example environment for use in a multi-direction deployable antenna in multiple phases.

FIG. 1 illustrates an example environment 100 for use in a multi-direction deployable antenna 102 in multiple phases. The example environment 100 includes a target body 104 (e.g., the Earth or other astronomical object). In the example environment, a launch vehicle 108 launches from the Earth, typically with multiple stages. In one implementation, an engine stage is ignited at launch and burns through a powered ascent until its propellants are exhausted. The engine stage is then extinguished, and a payload stage separates from the engine stage and is ignited in a first phase 105. The payload is carried atop the payload stage into orbit in the first phase, contained within payload fairings 112 that form a nose cone to protect a launch vehicle payload against the dynamic pressure and aerodynamic heating during launch through an atmosphere.

In this first phase 105, the multi-direction deployable antenna 102 is illustrated as stowed in a small-volume undeployed state (e.g., within a payload section 111) relative to the large-volume deployed state shown in a subsequent phase. In this case, the multi-direction deployable antenna 102 is smaller and is less massive than other deployable systems used for similar purposes.

In FIG. 1, the multi-direction deployable antenna 102 is shown in a second phase 107 in the space environment, with the payload fairings 112 jettisoned from a launch canister 114 (that contains the multi-direction deployable antenna 102 in a stowed or undeployed state, including antenna enclosure 115 (such as a satellite body), deployable support structures, and one or more antenna membranes 116. The antenna membranes 116 can be electromagnetic radiation directing surfaces or lenses. While described as a multi-direction deployable antenna 102, the multi-direction deployable antenna 102 can be adapted to transmit, phase shift, pass, direct, and/or redirect electromagnetic radiation in any portion of the electromagnetic spectrum (e.g., visible light, radio, microwave, infrared, ultraviolet, x-rays, gamma-rays, etc.) and may alternatively be called a deployable electromagnetic radiation antenna system.

In the illustrated implementation, the multi-direction deployable antenna 102 includes the antenna membranes

116 acting as the one or more antenna layers—an artificial dielectric layer, an active dipole layer (e.g., having an 8×8 array of dipoles/sub-apertures, each dipole or sub-aperture being separated by a predefined distance), and a ground layer. The three antenna membranes 116 of FIG. 1 are also separated from each other by predefined distances. While described as redirecting radiofrequency energy in implementations, the antenna membranes 116 can be adapted to direct and/or pass electromagnetic radiation of any frequency and/or wavelength, including ones outside of the radio wave portion of the electromagnetic spectrum. The antenna membranes 116 may include one or more flexible, semi-flexible, semi-rigid, rigid, both (perhaps alternating) rigid and panelized portions. Examples of antenna membranes 116 are contemplated with portions that are unfurled and/or expanded when being deployed after launch from a stowed state before and during launch.

The multi-direction deployable antenna 102 in FIG. 1 includes one or more deployment instruments, which may include without limitation a device providing one or more of unfurling, unrolling, and/or unfolding of the antenna membranes 116, such as by extending support structures (also herein referred to as deployable support structures) from the antenna enclosure 115. Example deployable support structures may include without limitation other deployment mechanisms, such as compression struts, extendable truss booms, tape springs, and/or an inflation element (e.g., a compressed air source) for expanding inflatable supports. Each deployable support structure can be extended from a deployment mechanism, such as a motorized extender (e.g., a screw mechanism) extending a telescoping truss boom, a latch or door constraining a telescoping truss boom, an active or passive tape dispenser for tape springs, or an inflation source for inflatable elements. The antenna membranes 116 may be a continuous surface or may be panelized or composed of multiple parts and assembled when deployed. The antenna membranes 116 may be one or more of an optical or a radiofrequency responsive surface. The antenna membranes 116 can have one or more active or passive directional elements.

As shown in a deployed state in phase 109, the multi-direction deployable antenna 102 includes the antenna enclosure 115 and the antenna membranes 116 connected to the antenna enclosure 115 by one or more deployable support structures, illustrated in FIG. 1 as including an extendable truss boom and tape springs 120. It should be appreciated that other deployable support structures, such as inflatable systems, coiled longeron booms, pantographic structures, or otherwise extendable structures, are contemplated. Furthermore, tape springs may have an open cross-section (e.g., like a carpenters tape), a closed cross-section (e.g., two carpenters tapes with concave surfaces facing each other and connected to form a closed cross-section), or a combination of these characteristics. The antenna enclosure 115 may include without limitation a variety of different subsystems, such as any combination of navigation subsystems, propulsion subsystems, control subsystems, communication subsystems, power subsystems, deployment subsystems, instrument subsystems, and any other payload subsystems.

The multi-direction deployable antenna 102 is shown in a deployed state in which the antenna membranes 116 have been expanded to a larger area relative to the size of the antenna membranes 116 in its undeployed state. The tensioning of the antenna membranes 116 into substantially parallel flat planes reduces the depth of the deployed surface(s) and requires fewer parts and less touch labor than other approaches. During deployment, the antenna membranes 116 are deployed away from the antenna enclosure 115 by the extendable truss boom 118 and/or the tape springs 120, which are mechanically or electronically synchronized to work in concert deploying and tensioning the antenna membrane lens. The tape springs 120 deploy in compression to balance the tension loads of the antenna membranes 116.

Figure 2:
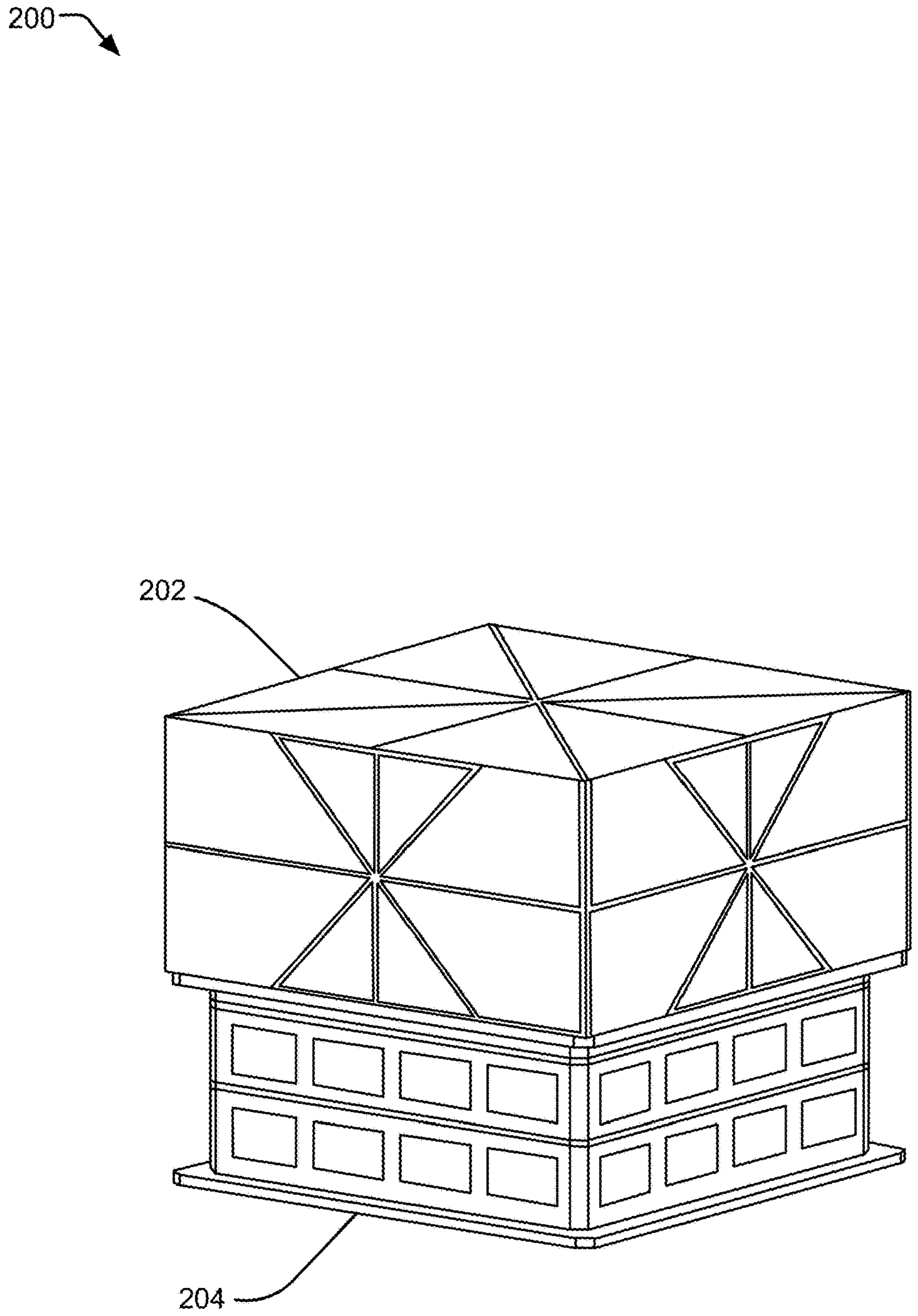
FIG. 2 illustrates an example multi-direction deployable antenna in a stowed configuration.

FIG. 2 illustrates an example multi-direction deployable antenna 200 in a stowed configuration. An antenna enclosure 202 encloses antenna membranes and deployable support structures while the multi-direction deployable antenna 200 is stowed. During deployment, one or more doors of the antenna enclosure 202 open to expose the antenna membranes and deployable support structures to the space environment.

The antenna enclosure 202 also includes an RF processor subsystem 204, which is attached to the antenna enclosure 202 in the illustrated implementation. In another implementation, the RF processor subsystem 204 may also be enclosed in the antenna enclosure 202. Further details of the RF processor subsystem 204 are provided below.

Figure 3:
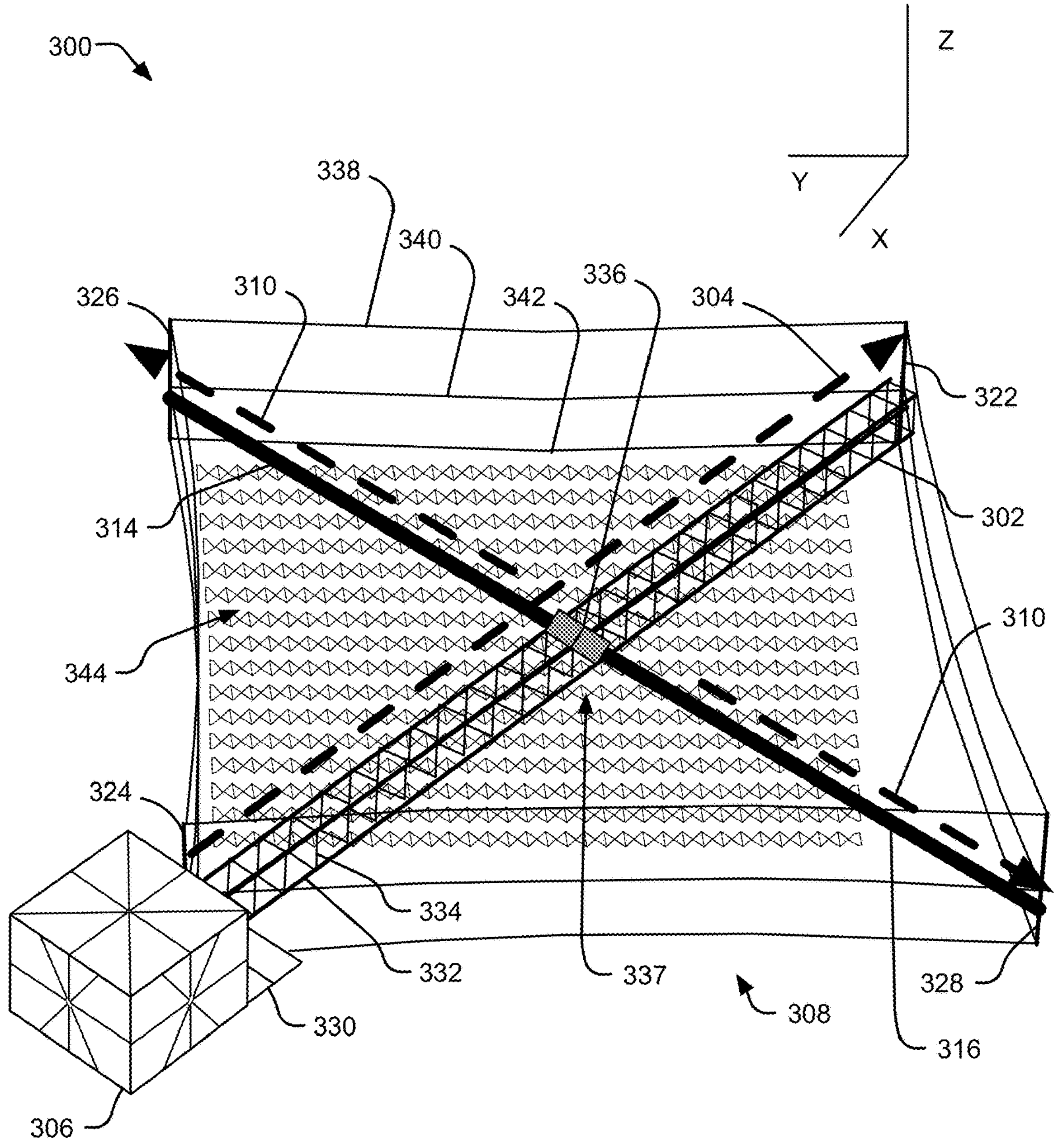
FIG. 3 illustrates an example multi-direction deployable antenna in a deployed configuration, wherein an extendable truss boom extends along an axis from an antenna enclosure during deployment.

FIG. 3 illustrates an example multi-direction deployable antenna 300 in a deployed configuration, wherein an extendable truss boom 302 extends along an axis 304 from an antenna enclosure 306 during deployment. In the illustrated example, the extendable truss boom 302 extends linearly away from the antenna enclosure 306 to unfurl antenna membranes 308 from their undeployed state along the axis 304 toward their deployed state. Likewise, tape springs 314 and 316 extend away from the extendable truss boom 302 to unfurl the antenna membranes 308 from their undeployed state along the axis 310 toward their deployed state. As such, a junction 337 between the extendable truss boom 302 and the tape springs 314 and 316 is positioned within the bounds of the antenna membranes 308 when viewed along the Z-axis (e.g., looking down on the antenna membranes from above in FIG. 3) such that the antenna membranes 308 overlap the junction 337. The antenna enclosure 306 is illustrated outside the bounds of the antenna membranes 308, although, in some implementations, these structures may also overlap to some extent.

Locations near the perimeter (e.g., edges) of the antenna membranes 308 may be operably anchored (e.g., directly or indirectly) to terminal ends and/or other portions of the extendable truss boom 302 and the tape springs 314 and 316. For the purposes of the description of the illustrated configuration in FIG. 3, the proximal end of the extendable truss boom 302 is located near the antenna enclosure 306 (e.g., near a pole 324), and the distal end of the extendable truss boom 302 is located near the pole 322. Likewise, the proximal ends of the tape springs 314 and 316 are located near the extendable truss boom 302, and the distal ends are located near the pole 326 and the pole 328, respectively. As the extendable truss boom 302 extends, the terminal end of the extendable truss boom 302 pushes and/or pulls the edges of the antenna membranes 308 along axis 304 to unfurl the antenna membranes 308 from their undeployed state toward their deployed state. Likewise, as the tape springs 314 and 316 extend to push and/or pull the edges of the antenna membranes 308 along axis 310 also to unfurl the antenna membranes 308 from their undeployed state toward their deployed state.

In the deployed state, the antenna membranes 308 are extended to a substantially planar and/or flat arrangement (or arrangement with multiple planes, e.g., a multifaceted arrangement) where the antenna membranes 308 are oriented substantially perpendicular to a Z-axis, referencing the legend in the upper-right hand corner of FIG. 3 (the deployed antenna membranes are depicted as being in or substantially parallel to the X-Y plane). For the purposes of this specification, substantially planar or substantially flat may mean that points on all or a portion of the deployed antenna membranes 308 diverge by less than a predefined distance in a plane or parallel planes (e.g., a plane defined by the peripheral edges of the antenna membranes 308) or a predefined angle relative to an edge (e.g., an edge among the peripheral edges of the antenna membranes 308). For example, predefined distances may be between any or be one or more of 1 millimeter (mm), 2 mm, 3 mm, 4 mm, 5 mm, 6 mm, 7 mm, 8 mm, 9 mm, 1 centimeter (cm), 1.5 cm, 2 cm, 3 cm, 4 cm, 5 cm, 10 cm, 15 cm, 20 cm, 25 cm, and 30 cm. Predefined angles may be between any or be one or more of 1°, 2°, 3°, 4°, 5°, 6°, 7°, 8°, 9°, 10°, 15°, 20°, 25°, 30°, and 35°. The extendable truss boom 302 may be deployed in synchronicity, in sequence, or in some temporally overlapping manner.

In the illustrated example, the extendable truss boom may include a variety of telescoping poles and/or extendable struts/tapes (collectively, extendable members) that extend from antenna enclosure 306. As shown in FIG. 3, four extendable members are bound by a series of battens to form the extendable truss boom 302. In some implementations, truss boom extenders, positioned in or near the antenna enclosure 306, in the form of a spring pushing the telescoping longerons to extend the extendable truss boom 302 away from the antenna enclosure 306, although alternative truss boom extenders may be employed (e.g., a motorized screw mechanism to extend the telescoping longerons).

A tape spring 314 and a tape spring 316 are configured to extend outward from the extendable truss boom 302 as they unfurl the antenna membranes 308. The tape springs may be or include bi-stable tapes that can be rolled up for stowage and unrolled for deployment to provide support for the antenna membranes 308. For example, tape dispensers (not illustrated) associated with each tape spring may be included as part of the multi-direction deployable antenna 300. In one implementation, the tape dispensers are positioned at a junction substantially in the middle of the extendable truss boom 302 (e.g., substantially equidistant between the terminal ends of the one or more extendable truss booms) when it is extended, although other implementations may position the tape dispensers at other positions along the extendable truss boom 302. For example, in one implementation, the tape dispensers are positioned at a junction substantially at least an eighth of the length of the one or more extendable truss booms from the terminal end of the one or more extendable truss booms. Tape springs and extendable truss booms are examples of deployable support structures.

In many implementations, positioning the tape dispensers at a junction with the terminal ends of the extendable truss boom 302 would not result in a rhombus-shaped antenna membrane after deployment, so such terminal end junctions are generally not employed. Nevertheless, the terminal ends of the extendable truss boom 302 may be used in other implementations to achieve other shapes for the antenna membranes 308.

Upon deployment of multi-direction deployable antenna 300, the tape dispensers may deploy the tapes from a rolled state to an unrolled state. In this example, the tapes may be carpenter-style tapes where the tapes extend (e.g., unroll from the tape dispensers) to expand antenna membranes 308 to their deployed state and provide a level of structural rigidity to the deployed state of antenna membranes 308.

In some cases, the antenna enclosure 306 includes or is attached to solar panels (or other power sources) and instrumentation. The antenna enclosure 306 may also include instrumentation for use in maneuvering the multi-direction deployable antenna 300 and/or the RF communications operations of the antenna.

The multi-direction deployable antenna 300 may communicate (e.g., emit or receive) radiofrequency (RF) waves or other energy frequency waves. Such radiofrequency energy or other electromagnetic radiation may be used to measure the moisture content on the surface of the Earth or for other radio frequency applications (e.g., a radiometer). In some implementations, the multi-direction deployable antenna 300 may be employed in radar applications, such as from UHF and L-band up to X and Ku, possibly as high as Ka.

When deployed, the antenna membranes 308 present substantially in the form of a rhombus constructed from multiple flexible membrane layers, subject to some tensioning nonlinearities and strictly nonplanar behaviors. Corners of the rhombus are operably anchored to or near the terminal ends of the extendable truss boom 302 and the tape springs 314 and 316.

The antenna membranes 308 present more than one surface. For example, the antenna membranes 308 can be a multifaceted element with multiple substantially flat and/or planar surfaces. The antenna membranes 308 may have a shape, for example, a pyramidal, triangular prismatic, rectangular prismatic (e.g., tent-like or v-shaped), other polygonal prismatic, spherical, hemispherical, curvilinear, or other shapes. In implementations, the antenna membranes 308 can have surfaces of the same or different sizes. The arrangements of the surfaces may be axisymmetrical about a center and/or central axis of the antenna membranes 308. The antenna membranes 308 can have some surfaces that pass electromagnetic beams and other surfaces that do not. In implementations, one or more of multiple facets of the antenna membranes 308 and/or phase-shifting properties of the antenna membranes 308 can cooperatively or independently cause beam splitting of the beam of electromagnetic radiation at or within the antenna membranes 308. Beam splitting may cause portions or elements of the beam of electromagnetic radiation to be emitted in different directions from the antenna membranes 308.

The multi-direction deployable antenna 300 can include a transceiver to receive and transmit communications between the multi-direction deployable antenna 300 and an external computing system (e.g., a computing system on Earth). RF elements (see artwork 344) form an array (e.g., an 8×8 array) of conductive dipole/sub-apertures on the active dipole membrane 340.

The multi-direction deployable antenna 300 can be further adapted to receive a received beam from the target body in response to the resulting phase-shifted beam. In alternative implementations, the multi-direction deployable antenna 300 may be a passive system that receives the received beam that is not responsive to an emitted beam emitted by the multi-direction deployable antenna 300. The antenna membranes 308 can phase shift the received beam to redirect the received beam in a direction that is substantially the reverse of the original direction from which the beam is communicated to or from the antenna feed. The multi-direction deployable antenna 300 may include an internal computing system (e.g., in or attached to the antenna enclosure 306) that includes a processor and a memory, the processor to execute operations stored in memory. Operations can include receiving data representing the received RF signals, associating the data representing the received beam geometric associating data, and transmitting the data representing the received beam and the association to a different computing system. The computing system can further account, in the association, for any time between the emitting of the resulting phase-shifted beam (or the originally emitted beam) and the receiving data representing the received beam. The accounting may be conducted by a data generation module.

An example payload of a multi-direction deployable antenna 400 includes an antenna subsystem and a radio frequency (RF) processor subsystem, which may be located in or attached to the antenna enclosure 408. In one implementation, the RF processor subsystem outputs a 28 VDC power supply to the antenna subsystem and a deployment enable signal to the antenna subsystem to trigger deployment of the multi-direction deployable antenna 400. The RF processor subsystem also controls the RF signaling operation of the deployable antenna system. A primary network node autonomously connects and controls the satellite system of which the deployable antenna system is a component and coordinates communications to/from multiple satellites in a constellation of related satellites.

The generated data may be associated, using a data generation module, with geometric associating data to associate data representing electromagnetic radiation beams (e.g., a received and/or emitted beam(s)) with a relative geometric characteristic of the multi-direction deployable antenna. Geometric associating data may represent the position and/or orientation of the multi-direction deployable antenna and/or the antenna membranes 308 relative to one or more of, without limitation, a target, a monitoring station, an external computing device, a communication array, and nadir. Examples of geometric associating data include data representing one or more of an orientation of the antenna membranes 308, nadir, an orbital position of the multi-direction deployable antenna 300, a timestamp for data transmitted and/or received from and/or by the multi-direction deployable antenna, a rate of oscillation (or rotational velocity) of an element of the electromagnetic radiation antenna system, and a rotational velocity of the antenna membranes 308 and/or the multi-direction deployable antenna 300. The generated data may account for any time or position delay between transmission of an emitted beam (e.g., from a transmitting operation) to reception of a responsively received beam (e.g., in a receiving operation).

In summary, FIG. 3 illustrates an implementation of a multi-direction deployable antenna 300. An extendable truss boom 302 is operably anchored to an edge of the antenna membranes 308 to deploy that edge away from the antenna enclosure 306 by extending along an axis from the antenna enclosure 306. In one implementation, the opposite edge of the antenna membranes 308 is operably anchored to the antenna enclosure 306 and/or the end of the extendable truss boom 302. The one or more antenna membranes 308 are operably anchored to at least one end of the extendable truss boom by a pole 322, although other anchoring structures may be employed (e.g., fasteners, lanyards, combinations thereof).

The antenna enclosure 306 is shown as open in the deployed configuration of FIG. 3, with a door 330 open to expose the extendable truss boom 302. The extendable truss boom 302 extends in a first direction (e.g., along a first axis) from the antenna enclosure 306, although other implementations may include a truss boom that extends from the antenna enclosure 306 in more than one direction (e.g., in opposite directions—see FIG. 4). The illustrated implementation shows an extendable truss boom 302 including four longerons (e.g., longeron 332) supported by multiple battens (e.g., batten 334) spaced periodically along the truss boom 302. In one implementation, the longerons extend in a telescoping manner, although other extending mechanisms may be employed. In other implementations, the number of longerons may be greater or less than four.

Two tape dispensers 336 are also positioned at the junction 337 along substantially half the length of the extendable truss boom 302 at deployment. In one implementation, the tape dispensers 336 are configured to deploy after the extendable truss boom 302 is fully extended, but this timing may be adjusted as desired. In FIG. 3, the tape dispensers 336 deploy two tape springs 314 and 316 perpendicularly away from the extendable truss boom 302, although other angles may be employed. It should be understood that such tape dispensers may be active (e.g., motorized) to unroll the tape springs or passive to allow the tape springs to unroll under their own stored strain energy. In both cases, the tape springs may be constrained by a latch or other mechanism until the deployment is triggered and the time for tape spring extension has been reached, at which point the latch releases and the tapes unroll. (In some implementations, the tape springs are rolled up in opposition to their own bias to remain unrolled. As such, when a mechanism constraining a rolled tape spring is released, the stored strain energy will cause the tape spring to unroll, thereby extending the tape spring to unfurl the antenna membrane.) In addition, in some implementations, the tape springs and/or the extendable truss may be replaced with other deployable support structures, such as compression struts, tape springs, extendable truss booms, telescoping booms, inflatable booms, etc. As shown in FIG. 3, the planar extent of the flexible membranes of the membrane antenna overlaps the junction 337 at the tape dispensers 336 (e.g., overlapping the junction of the extendable truss boom 302 and the tape springs 314 and 316 when observed along the Z-axis).

In the illustrated implementation, the antenna includes three membrane layers: an artificial dielectric membrane 338, an active dipole membrane 340, and a ground plane membrane 342, although the number of membranes may be greater or less than three. Points on or near the periphery of the membranes are anchored to the extendable truss boom 302 or the tape springs 314 and 316, causing the membranes to unfurl as the extendable truss boom 302 and tape springs 314 and 316 extend. In this manner, the stowed membranes are expanded to provide a larger aperture than would be possible in their stowed condition. The membrane layers are spatially separated from each other by a distance that this larger than the thickness of each membrane. For example, in one implementation having three layers (e.g., an artificial dielectric layer; an active dipole layer having an 8×8 array of dipoles/sub-apertures, and a ground layer), the first two layers are separated by 7.5 inches, and the second two layers are separated by 5.9 inches. Each dipole in the array is separated by 7.52 inches.

RF elements (see artwork 344) form an array (e.g., an 8×8 array) of conductive dipole/sub-apertures mounted on the active dipole membrane 340. In one implementation, the individual dipoles/sub-apertures of the array are spaced by 7.52 inches, although such spacing may depend on the overall size of the antenna membrane and/or the communication application for which it is used. In other implementations, a sinuous or spiral pattern of RF elements may be used instead of an array. RF cables (e.g., coaxial or twisted pair cables—not shown) connect the RF elements to a feed (not shown) at the extendable truss boom 302 (connected to a power supply and RF control system in the antenna enclosure 306 or the RF processor). The RF cables are stowed in such a way as to deploy without catching or tangling as the membrane antenna unfurls. Furthermore, the RF elements (and potentially active tape dispensers, if needed) may be fed by one or more electrical connections running from the antenna enclosure through or along the extendable truss boom to the artwork 344 and/or the coax cables. In some implementations, the one or more electrical connectors may be strung along the extendable truss boom and, in some of these implementations, through the battens of the extendable truss boom. Accordingly, the described technology may be applied to active antennas (e.g., having RF elements powered by an electrical connection) and/or passive antennas (e.g., a reflectarray illuminated by a feed antenna or other RF source).

Figure 4:
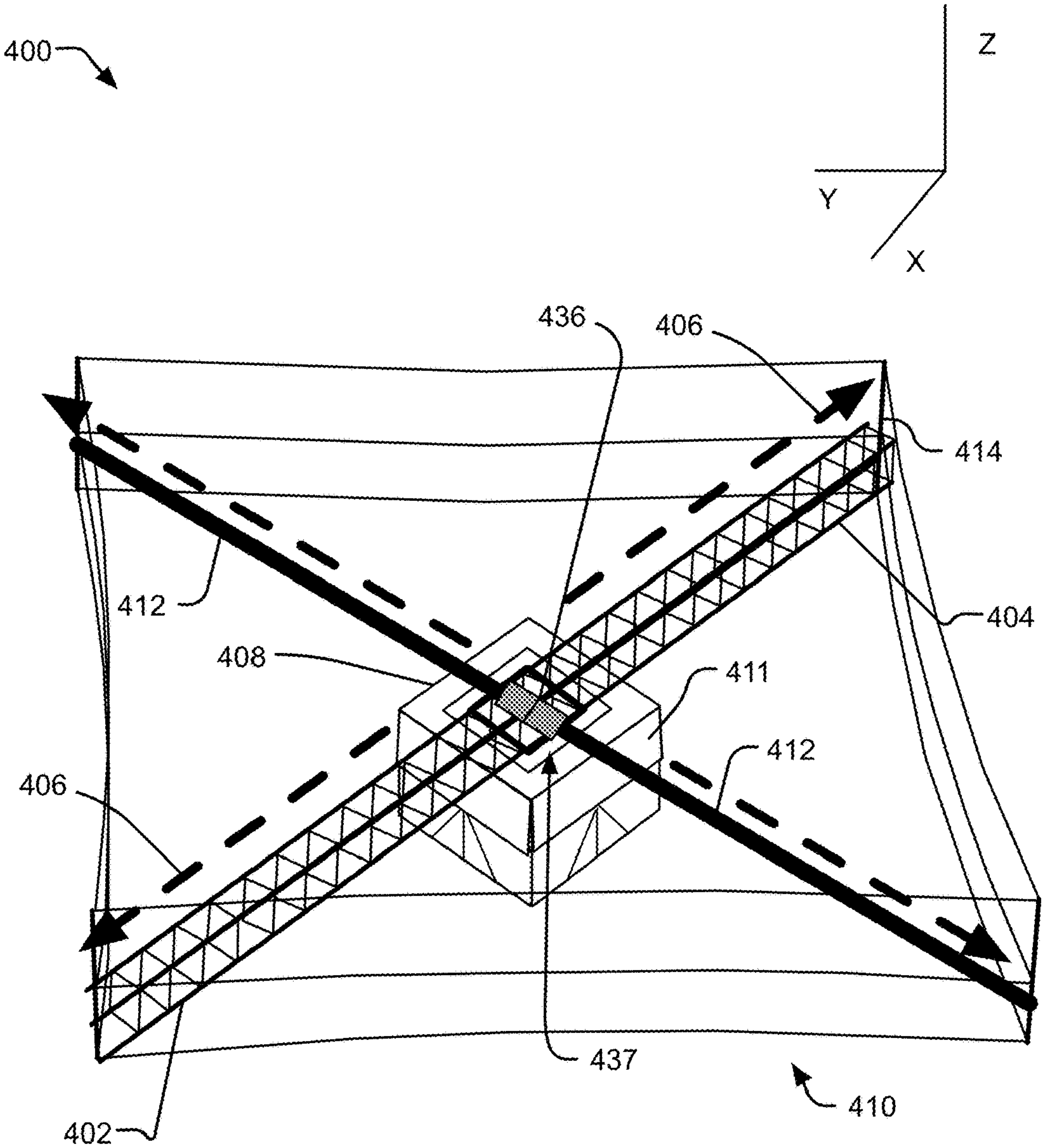
FIG. 4 illustrates another example multi-direction deployable antenna in a deployed configuration.

FIG. 4 illustrates another example multi-direction deployable antenna 400 in a deployed configuration. This implementation is similar to the implementation depicted in FIG. 3 but differs in that two extendable truss booms 402 and 404 extend along an axis 406 in opposite directions from an antenna enclosure 408 during deployment, rather than a single extendable truss boom extending in a single direction. Also, rather than being positioned to one side of the deployed antenna membranes, the antenna enclosure and the junction between the extendable truss booms 402 and the tape springs 412 are positioned within the bounds of the antenna membranes 410 when viewed along the Z-axis (e.g., looking down on the antenna membranes from above in FIG. 4).

As described, multiple extendable truss booms are used to deploy edges of the antenna membranes 410 away from the antenna enclosure 408, thereby unfurling the antenna membranes (note: artwork similar to the artwork 344 in FIG. 3 is also present in the implementation of FIG. 4, but it has been removed from the drawing to better present the underlying antenna enclosure). Likewise, the multi-direction deployable antenna 400 also includes similar electrical connections to the implementation of FIG. 3, such as the coax cabling.

In this implementation, one or more doors (e.g., door 411) expose the antenna membranes 410 to the space environment, allowing the extendable truss booms 402 and 404 to extend from the antenna enclosure. The stowed antenna membranes 410, the extendable truss booms 402 and 404, the tape springs 412, and associated truss boom extenders and trap dispensers are raised to clear the open top, and then the truss boom extenders and trap dispensers extend their corresponding supports, although, in other implementations, the doors of the antenna enclosure could fold away enough to not require the raising operation.

The two extendable truss booms 402 and 404 are operably anchored to edges (e.g., opposite edges) of the antenna membranes 410 to deploy those edges away from the antenna enclosure 408 by extending along an axis in opposite directions from the antenna enclosure 408. Likewise, tape springs 412 unfurl the antenna membranes 410 along another axis (e.g., an orthogonal axis to the extendable truss booms 402 and 404). The one or more antenna membranes 410 are operably anchored to the extendable truss booms 402 and 404 and to the tape springs 412 by poles (e.g., the pole 414), although other anchoring structures may be employed (e.g., fasteners, lanyards, combinations thereof).

Two tape dispensers 436 are also positioned at a junction 437 along substantially half the length of the extendable truss booms 402 and 404 at deployment. In one implementation, the tape dispensers 436 are configured to deploy after the extendable truss booms 402 and 404 are fully extended, but this timing may be adjusted as desired. In FIG. 4, the tape dispensers 436 deploy two tape springs 412 perpendicularly away from the extendable truss booms 402 and 404, although other angles may be employed. As shown in FIG. 4, the planar extent of the flexible membranes of the membrane antenna overlaps the junction 437 at the tape dispensers 436 (e.g., the junction of the extendable truss boom 404 and the tape springs 412 when observed along the Z-axis). It should be understood that such tape dispensers may be active (e.g., motorized) to unroll the tape springs or passive to allow the tape springs to unroll under their own tensional force. In both cases, the tape springs may be constrained by a latch or other mechanism until the deployment is triggered and the time for tape spring extension has been reached.

Figure 5:
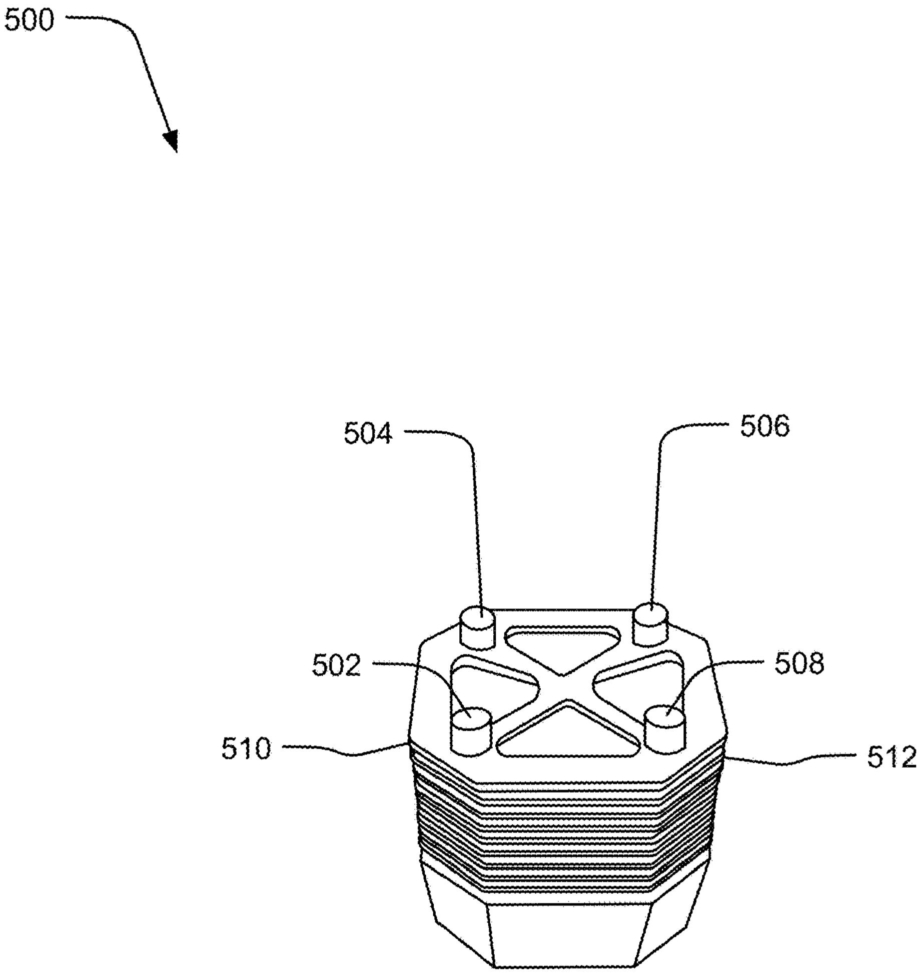
FIG. 5 illustrates an example extendable truss boom in an undeployed state.

FIG. 5 illustrates an example extendable truss boom 500 in an undeployed state. The extendable truss boom 500 includes four telescoping longerons (e.g., as shown by the ends or end caps of telescoping longerons 502, 504, 506, and 508) that are bound by numerous battens (e.g., a batten 510 and a batten 512). The telescoping longerons and the battens are collapsed for stowage in an antenna enclosure (not shown).

Figure 6:
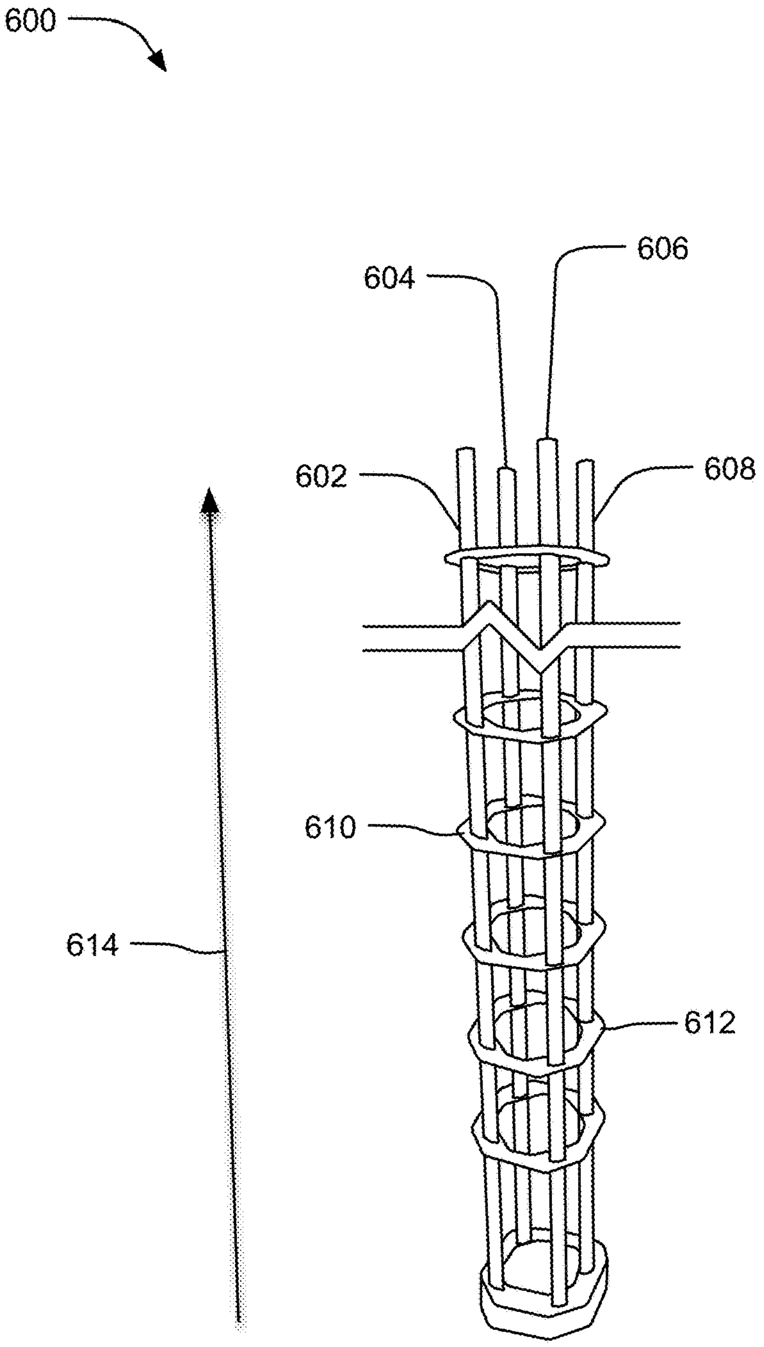
FIG. 6 illustrates an example extendable truss boom in a deployed state.
Figure 7:
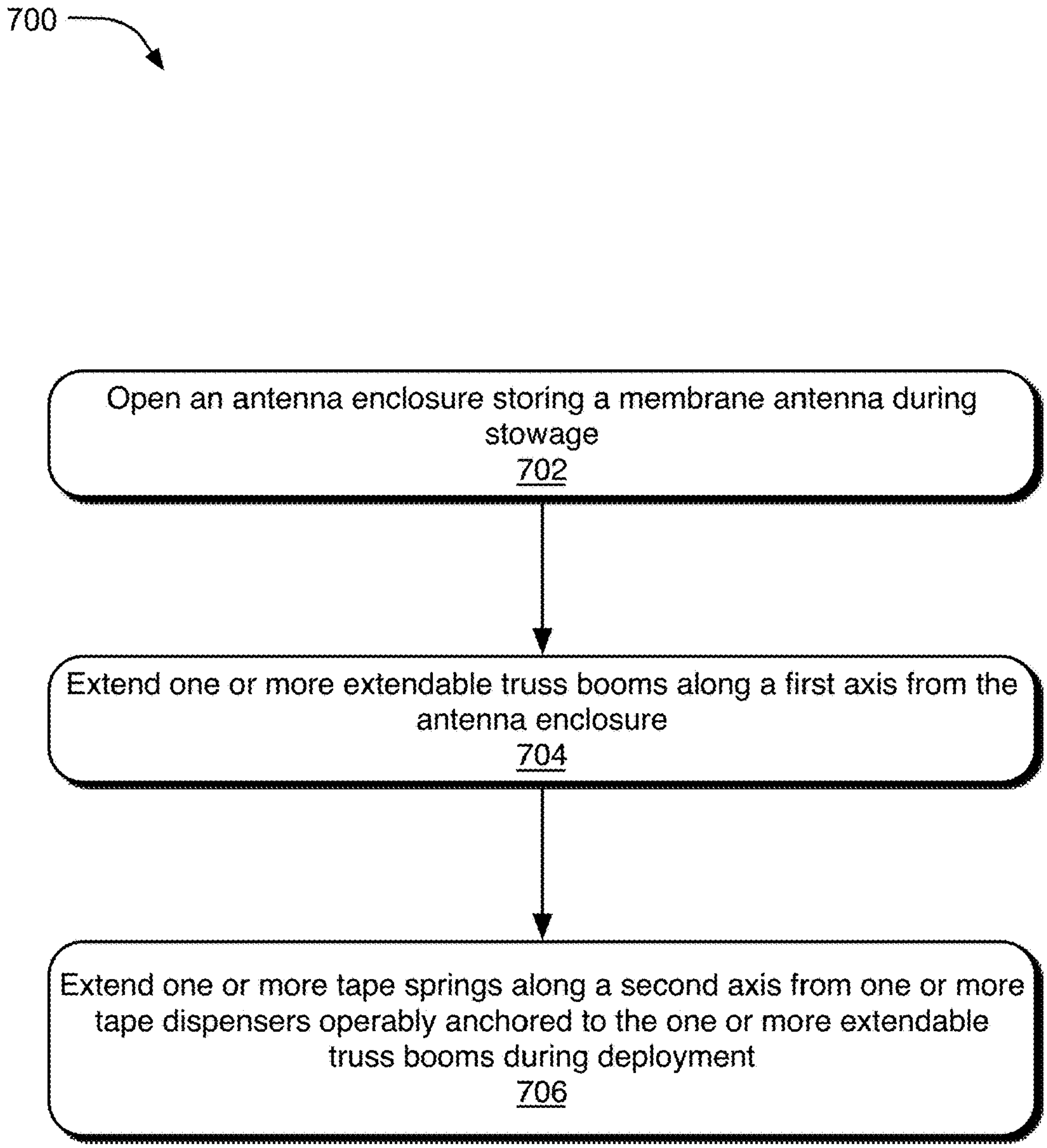
FIG. 7 illustrates example operations for deploying a multi-direction deployable antenna.

FIG. 6 illustrates an example extendable truss boom 600 in a deployed state. The extendable truss boom 600 includes four telescoping longerons 602, 604, 606, and 608 that are bound by numerous battens (e.g., a batten 610 and a batten 612). The telescoping longerons and the battens are extended along an extension axis 614, which is substantially parallel to the axis of each longeron in the illustrated implementation, for deployment from an antenna enclosure (not shown). The battens improve the rigidity and strength of the extendable truss boom 600 as and after it is extended FIG. 7 illustrates example operations 700 for deploying a multi-direction deployable antenna. In a space environment, a deployment operation 702 opens an antenna disclosure that stows a membrane antenna. In one implementation, one or more doors of the antenna disclosure open to expose the membrane antenna to the space environment.

A truss deployment operation 704 extends one or more extendable truss booms along a first axis from the antenna enclosure. At least a first point of the membrane antenna is operably anchored to a point on the one or more extendable truss booms, such that extension of the extendable truss boom(s) partially unfurls the antenna membranes, at least along the first axis.

A tape spring deployment operation 706 extends one or more tape springs along a second axis from one or more tape dispensers operably anchored to the one or more extendable truss booms during deployment. At least a second point of the membrane antenna is operably anchored to a point on the one or more tape springs, such that the extension of the tape springs partially unfurls the antenna membranes, at least along the second axis. In combination, the extension of the one or more extendable truss booms and one or more tape springs unfurls the membrane antenna along the first axis and the second axis.

In some aspects, an example antenna system for space applications is provided, including: a membrane antenna including one or more flexible membranes; an antenna enclosure configured to store the membrane antenna during stowage; one or more first deployable support structures configured to extend along a first axis from the antenna enclosure during deployment, at least a first point of the membrane antenna being operably anchored to a point on the one or more first deployable support structures; and one or more deployment mechanisms operably anchored at a junction with the one or more first deployable support structures, the one or more deployment mechanisms being configured to extend one or more second deployable support structures along a second axis from the one or more first deployable support structures during deployment, at least a second point of the membrane antenna being operably anchored to a point on the one or more second deployable support structures, wherein extension of the one or more first deployable support structures and one or more second deployable support structures unfurls the membrane antenna along the first axis and the second axis to overlap the junction.

In some aspects, another example antenna system of any preceding antenna system is provided, wherein the one or more first deployable support structures include at least one first deployable support structure extending along the first axis away from the antenna enclosure and the one or more second deployable support structures include at least second deployable support structures along the second axis in opposite directions from the at least one first deployable support structure.

In some aspects, another example antenna system of any preceding antenna system is provided, wherein the one or more first deployable support structures include at least two first deployable support structures extending along the first axis in opposite directions from the antenna enclosure and the one or more second deployable support structures include at least two second deployable support structures along the second axis in opposite directions from the antenna enclosure.

In some aspects, another example antenna system of any preceding antenna system is provided, wherein the membrane antenna unfurls during deployment along at least two axes to substantially form a rhombus, wherein two opposing corners of the rhombus are operably anchored to the one or more first deployable support structures and two other opposing corners of the rhombus are operably anchored to the one or more second deployable support structures.

In some aspects, another example antenna system of any preceding antenna system is provided, wherein the one or more first deployable support structures include one or more extendable truss booms.

In some aspects, another example antenna system of any preceding antenna system is provided, wherein the one or more first deployable support structures include one or more tape springs.

In some aspects, another example antenna system of any preceding antenna system is provided, wherein the one or more deployment mechanisms include one or more tape dispensers.

In some aspects, another example antenna system of any preceding antenna system is provided, wherein the first axis and the second axis are substantially orthogonal to each other.

In some aspects, another example antenna system of any preceding antenna system is provided, wherein the one or more flexible membranes of the membrane antenna are deployed substantially into one or more planes that are parallel to the first axis and the second axis to overlap the junction.

In some aspects, another example antenna system of any preceding antenna system is provided, wherein the one or more deployment mechanisms are positioned between terminal ends of the one or more first deployable support structures and at least an eighth of a length of one of the one or more first deployable support structures from the terminal ends of the one or more first deployable support structures.

In some aspects, another example antenna system of any preceding antenna system is provided, wherein the one or more deployment mechanisms are positioned substantially equidistant between terminal ends of the one or more first deployable support structures.

In some aspects, another example antenna system of any preceding antenna system is provided, wherein the first point of the membrane antenna is operably anchored at a terminal point on the one or more first deployable support structures.

In some aspects, another example antenna system of any preceding antenna system is provided, wherein the one or more deployment mechanisms are further configured to extend the one or more second deployable support structures from the one or more first deployable support structures in opposite directions.

In some aspects, another example antenna system of any preceding antenna system is provided, wherein the membrane antenna includes at least three flexible membrane layers.

In some aspects, another example antenna system of any preceding antenna system is provided, wherein the at least three flexible membrane layers include a dielectric layer, an active dipole layer, and a ground layer.

In some aspects, another example antenna system of any preceding antenna system is provided, wherein at least two of the membrane layers are spatially separated from each other by a distance greater than a thickness of each membrane layer.

In some aspects, another example antenna system of any preceding antenna system is provided, wherein the membrane antenna is fed by electrical connections strung along the one or more first deployable support structures.

In some aspects, another example antenna system of any preceding antenna system is provided, wherein the membrane antenna includes radio frequency elements mounted on a membrane and further including: an electrical connection running from the antenna enclosure; and one or more radio frequency cables connecting the electrical connection to the radio frequency elements mounted on the membrane.

In some aspects, an example method for deploying an antenna system from stowage for space applications is provided, including: opening an antenna enclosure storing a membrane antenna during stowage; extending one or more first deployable support structures along a first axis from the antenna enclosure, at least a first point of the membrane antenna being operably anchored to a point on the one or more first deployable support structures; and extending one or more second deployable support structures along a second axis from one or more deployment mechanisms operably anchored at a junction with the one or more first deployable support structures during deployment, at least a second point of the membrane antenna being operably anchored to a point on the one or more second deployable support structures, wherein extension of the one or more first deployable support structures and one or more second deployable support structures unfurls the membrane antenna along the first axis and the second axis.

In some aspects, another example method of any preceding method is provided, wherein the one or more first deployable support structures include at least one first deployable support structure extending along the first axis away from the antenna enclosure and the one or more second deployable support structures include at least two second deployable support structures along the second axis in opposite directions from the at least one first deployable support structure.

In some aspects, another example method of any preceding method is provided, wherein the one or more first deployable support structures include at least two second deployable support structures extending along the first axis in opposite directions from the antenna enclosure and the one or more second deployable support structures include at least two second deployable support structures along the second axis in opposite directions from the antenna enclosure.

In some aspects, another example method of any preceding method is provided, wherein the membrane antenna unfurls during deployment along at least two axes to substantially form a rhombus, wherein two opposing corners of the rhombus are operably anchored to the one or more first deployable support structures and two other opposing corners of the rhombus are operably anchored to the one or more second deployable support structures.

In some aspects, another example method of any preceding method is provided, wherein the one or more first deployable support structures include one or more extendable truss booms.

In some aspects, another example method of any preceding method is provided, wherein the one or more first deployable support structures include one or more tape springs.

In some aspects, another example method of any preceding method is provided, wherein the one or more deployment mechanisms include one or more tape dispensers.

In some aspects, another example method of any preceding method is provided, wherein the first axis and the second axis are substantially orthogonal to each other.

In some aspects, another example method of any preceding method is provided, wherein the membrane antenna includes one or more flexible membranes of the membrane antenna that are deployed substantially into one or more planes that are parallel to the first axis and the second axis to overlap the junction.

In some aspects, another example method of any preceding method is provided, wherein the one or more deployment mechanisms are positioned between terminal ends of the one or more first deployable support structures and at least an eighth of a length of one of the one or more first deployable support structures from the terminal ends of the one or more first deployable support structures.

In some aspects, another example method of any preceding method is provided, wherein the one or more deployment mechanisms are positioned substantially equidistant between terminal ends of the one or more first deployable support structures.

In some aspects, an example system for deploying an antenna system from stowage for space applications is provided, including: means for opening an antenna enclosure storing a membrane antenna during stowage; means for extending one or more first deployable support structures along a first axis from the antenna enclosure, at least a first point of the membrane antenna being operably anchored to a point on the one or more first deployable support structures; and means for extending one or more second deployable support structures along a second axis from one or more deployment mechanisms operably anchored at a junction with the one or more first deployable support structures during deployment, at least a second point of the membrane antenna being operably anchored to a point on the one or more second deployable support structures, wherein extension of the one or more first deployable support structures and one or more second deployable support structures unfurls the membrane antenna along the first axis and the second axis.

In some aspects, another example system of any preceding system is provided, wherein the one or more first deployable support structures include at least one first deployable support structure extending along the first axis away from the antenna enclosure and the one or more second deployable support structures include at least two second deployable support structures along the second axis in opposite directions from the at least one first deployable support structure.

In some aspects, another example system of any preceding system is provided, wherein the one or more first deployable support structures include at least two second deployable support structures extending along the first axis in opposite directions from the antenna enclosure and the one or more second deployable support structures include at least two second deployable support structures along the second axis in opposite directions from the antenna enclosure.

In some aspects, another example system of any preceding system is provided, wherein the membrane antenna unfurls during deployment along at least two axes to substantially form a rhombus, wherein two opposing corners of the rhombus are operably anchored to the one or more first deployable support structures and two other opposing corners of the rhombus are operably anchored to the one or more second deployable support structures.

In some aspects, another example system of any preceding system is provided, wherein the one or more first deployable support structures include one or more extendable truss booms.

In some aspects, another example system of any preceding system is provided, wherein the one or more first deployable support structures include one or more tape springs.

In some aspects, another example system of any preceding system is provided, wherein the one or more deployment mechanisms include one or more tape dispensers.

In some aspects, another example system of any preceding system is provided, wherein the first axis and the second axis are substantially orthogonal to each other.

In some aspects, another example system of any preceding system is provided, wherein the membrane antenna includes one or more flexible membranes of the membrane antenna that are deployed substantially into one or more planes that are parallel to the first axis and the second axis to overlap the junction.

In some aspects, another example met system hod of any preceding system is provided, wherein the one or more deployment mechanisms are positioned between terminal ends of the one or more first deployable support structures and at least an eighth of a length of one of the one or more first deployable support structures from the terminal ends of the one or more first deployable support structures.

In some aspects, another example system of any preceding system is provided, wherein the one or more deployment mechanisms are positioned substantially equidistant between terminal ends of the one or more first deployable support structures.

While this specification contains many specific implementation details, these should not be construed as limitations on the scope of any inventions or of what may be claimed, but rather as descriptions of features specific to particular embodiments of a particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

A number of implementations of the described technology have been described. Nevertheless, it will be understood that various modifications can be made without departing from the spirit and scope of the recited claims.

What is claimed is:

1. An antenna system for space applications, the antenna system comprising:

- a membrane antenna including one or more flexible membranes;
- an antenna enclosure configured to store the membrane antenna during stowage;
- one or more first deployable support structures configured to extend along a first axis from the antenna enclosure during deployment, at least a first point of the membrane antenna being operably anchored to a point on the one or more first deployable support structures; and
- one or more deployment mechanisms operably anchored at a junction the one or more first deployable support structures, wherein the junction is separated from the antenna enclosure in a first direction along the first axis and is disposed on the one or more first deployable structures, the one or more deployment mechanisms being configured to extend one or more second deployable support structures from the junction along a second axis from the one or more first deployable support structures during deployment, at least a second point of the membrane antenna being operably anchored to a point on the one or more second deployable support structures, wherein extension of the one or more first deployable support structures and the one or more second deployable support structures unfurls the membrane antenna along the first axis and the second axis to overlap the junction.

2. The antenna system of claim 1, wherein the one or more first deployable support structures include at least one first deployable support structure extending along the first axis away from the antenna enclosure and the one or more second deployable support structures include at least two second deployable support structures along the second axis in opposite directions from the at least one first deployable support structure.

3. The antenna system of claim 1, wherein the one or more first deployable support structures include at least two first deployable support structures extending along the first axis in opposite directions from the antenna enclosure and the one or more second deployable support structures include at least two second deployable support structures along the second axis in opposite directions from the antenna enclosure.

4. The antenna system of claim 1, wherein the membrane antenna unfurls during deployment along at least two axes to substantially form a rhombus, wherein two opposing corners of the rhombus are operably anchored to the one or more first deployable support structures and two other opposing corners of the rhombus are operably anchored to the one or more second deployable support structures.

5. The antenna system of claim 1, wherein the one or more first deployable support structures include one or more extendable truss booms.

6. The antenna system of claim 1, wherein the one or more first deployable support structures include one or more tape springs.

7. The antenna system of claim 1, wherein the one or more deployment mechanisms include one or more tape dispensers.

8. The antenna system of claim 1, wherein the first axis and the second axis are substantially orthogonal to each other.

9. The antenna system of claim 1, wherein the one or more flexible membranes of the membrane antenna are deployed substantially into one or more planes that are parallel to the first axis and the second axis to overlap the junction.

10. The antenna system of claim 1, wherein the one or more deployment mechanisms are positioned between terminal ends of the one or more first deployable support structures and at least an eighth of a length of one of the one or more first deployable support structures from the terminal ends of the one or more first deployable support structures.

11. The antenna system of claim 1, wherein the one or more deployment mechanisms are positioned substantially equidistant between terminal ends of the one or more first deployable support structures.

12. The antenna system of claim 1, wherein the first point of the membrane antenna is operably anchored at a terminal point on the one or more first deployable support structures.

13. The antenna system of claim 1, wherein the one or more deployment mechanisms are further configured to extend the one or more second deployable support structures from the one or more first deployable support structures in opposite directions.

14. The antenna system of claim 1, wherein the membrane antenna includes at least three flexible membrane layers.

15. The antenna system of claim 14, wherein the at least three flexible membrane layers include a dielectric layer, an active dipole layer, and a ground layer.

16. The antenna system of claim 14, wherein at least two of the at least three flexible membrane layers are spatially separated from each other by a distance greater than a thickness of each membrane layer.

17. The antenna system of claim 1, wherein the membrane antenna is fed by electrical connections strung along the one or more first deployable support structures.

18. The antenna system of claim 1, wherein the membrane antenna includes radio frequency elements mounted on a membrane and further comprising:

- an electrical connection running from the antenna enclosure; and
- one or more radio frequency cables connecting the electrical connection to the radio frequency elements mounted on the membrane.

19. A method for deploying an antenna system from stowage for space applications, the method comprising:

opening an antenna enclosure storing a membrane antenna during stowage;

extending one or more first deployable support structures along a first axis from the antenna enclosure, at least a first point of the membrane antenna being operably anchored to a point on the one or more first deployable support structures; and extending one or more second deployable support structures along a second axis from one or more deployment mechanisms operably anchored at a junction with the one or more first deployable support structures during deployment, wherein the junction is separated from the antenna enclosure in a first direction along the first axis and is disposed on the one or more first deployable structures, at least a second point of the membrane antenna being operably anchored to a point on the one or more second deployable support structures, wherein extension of the one or more first deployable support structures and the one or more second deployable support structures unfurls the membrane antenna along the first axis and the second axis.

20. The method of claim 19, wherein the one or more first deployable support structures include at least one first deployable support structure extending along the first axis away from the antenna enclosure and the one or more second deployable support structures include at least two second deployable support structures along the second axis in opposite directions from the at least one first deployable support structure.

21. The method of claim 19, wherein the one or more first deployable support structures include at least two first deployable support structures extending along the first axis in opposite directions from the antenna enclosure and the one or more second deployable support structures include at least two second deployable support structures along the second axis in opposite directions from the antenna enclosure.

22. The method of claim 19, wherein the membrane antenna unfurls during deployment along at least two axes to substantially form a rhombus, wherein two opposing corners of the rhombus are operably anchored to the one or more first deployable support structures and two other opposing corners of the rhombus are operably anchored to the one or more second deployable support structures.

23. The method of claim 19, wherein the one or more first deployable support structures include one or more extendable truss booms.

24. The method of claim 19, wherein the one or more first deployable support structures include one or more tape springs.

25. The method of claim 19, wherein the one or more deployment mechanisms include one or more tape dispensers.

26. The method of claim 19, wherein the first axis and the second axis are substantially orthogonal to each other.

27. The method of claim 19, wherein the membrane antenna includes one or more flexible membranes of the membrane antenna that are deployed substantially into one or more planes that are parallel to the first axis and the second axis to overlap the junction.

28. The method of claim 19, wherein the one or more deployment mechanisms are positioned between terminal ends of the one or more first deployable support structures and at least an eighth of a length of one of the one or more first deployable support structures from the terminal ends of the one or more first deployable support structures.

29. The method of claim 19, wherein the one or more deployment mechanisms are positioned substantially equidistant between terminal ends of the one or more first deployable support structures.

* * * * *